April 14, 1931.   C. H. HARDING   1,801,079
MANUFACTURE OF SHEET GLASS
Filed May 5, 1930   2 Sheets-Sheet 1
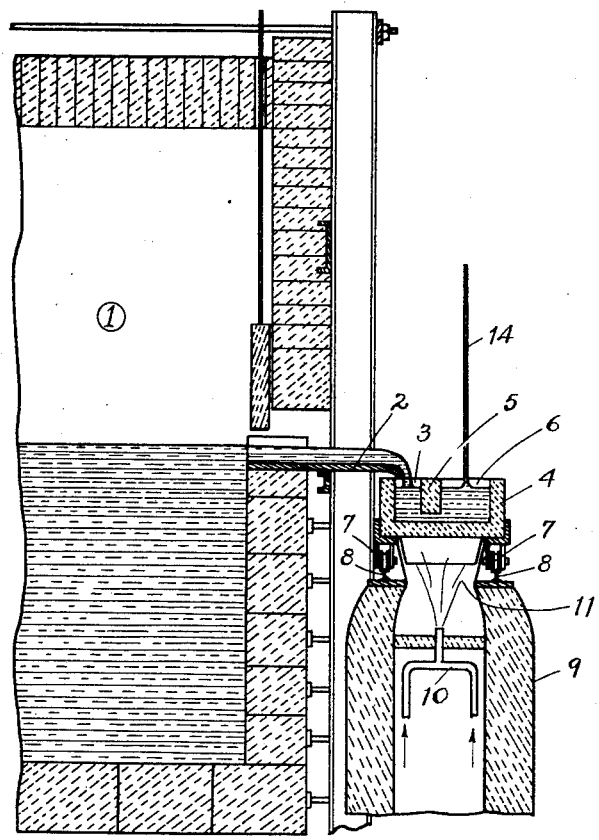
Fig. I
INVENTOR
Charles H. Harding
by Christy, Christy and Wharton
attorneys April 14, 1931.  C. H. HARDING  1,801,079
MANUFACTURE OF SHEET GLASS
Filed May 5, 1930  2 Sheets-Sheet 2
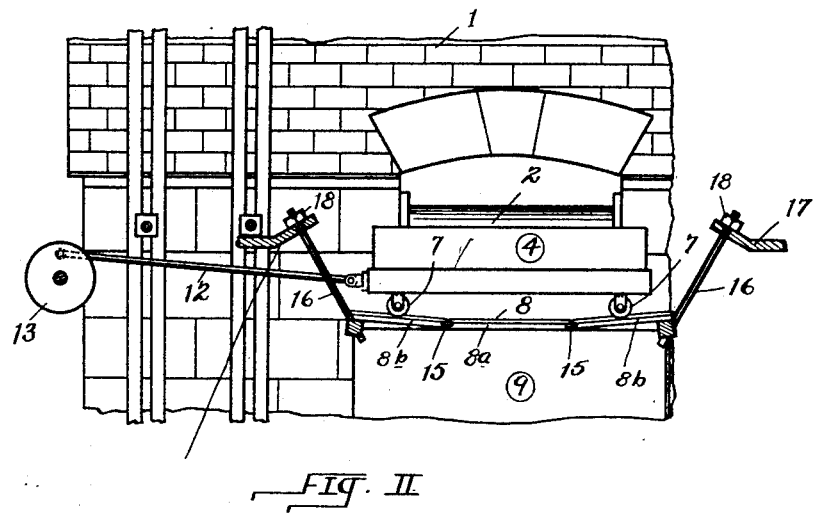
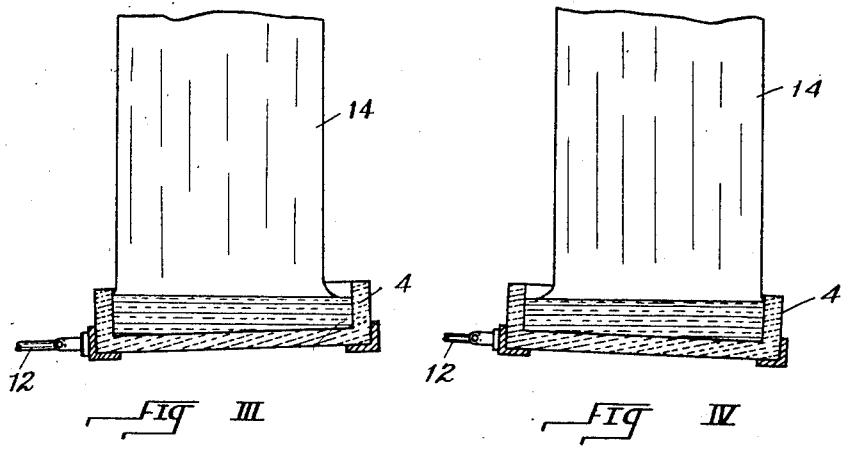
INVENTOR
Charles H. Harding
by Christy Christy and Wharton
attorneys Patented Apr. 14, 1931

1,801,079

UNITED STATES PATENT OFFICE

CHARLES H. HARDING, OF FORT SMITH, ARKANSAS

MANUFACTURE OF SHEET GLASS

Application filed May 5, 1930. Serial No. 449,707.

This invention relates to the manufacture of sheet glass, and consists in improvements in the apparatus for and the method of drawing glass in sheet form from a bath of molten glass. In the drawing of sheet glass it is difficult to obtain the desired homogeneity of the body of molten glass from which glass sheets are drawn. According to usual practice the molten bath contains both glass melted from fresh batch and glass melted from cullet, and the molten cullet is usually of a somewhat harder nature than the fresh glass, so that at the molten bath temperature its tenacity is greater. In general, it is for these reasons that the glass sheets are streaky, having slight irregularities in thickness in different portions of their width, and consequently their optical properties are impaired. In my Patent No. 1,584,768, dated May 18, 1926, I teach that, by reciprocating or oscillating the glass-containing receptacle in the line of the width of the sheet being drawn, the optical properties of the drawn sheets are much improved.

In the present invention I have the same general objects in view as those which are set forth in the above noted patent. By effecting the tilting or angular oscillation of the glass-containing receptacle while a sheet is being drawn therefrom, I have found that the product is further improved. This may be attributed to the fact that in so oscillating the receptacle the mass of molten glass therein is maintained in a more homogeneous condition during the sheet-drawing procedure. The product, accordingly, is of more uniform thickness and width, and has improved optical qualities.

In the accompanying drawings I have shown conventionally apparatus for the practice of the invention. Fig. I is a view in longitudinal sectional elevation of the delivery end of a tank furnace, showing an associated drawing receptacle and its heating furnace or kiln in cross-sectional elevation. Fig. II is a fragmentary front elevation of the same. Fig. III is a view in longitudinal section of the drawing receptacle in one of its operating positions; and Fig. IV is a similar view of the drawing receptacle in another operating position.

To effect the angular oscillation of the drawing receptacle about an axis which extends perpendicularly to the plane of sheet development is primarily within the concept of my invention. In so oscillating the drawing receptacle the depth of the body of glass therein is caused to change constantly from one end of the receptacle to the other, and consequently the molten glass is smoothly worked into a homogeneous condition, and is maintained in such condition during the drawing process. The ultimate effect of the operation is to prevent streaks of thick-and-thin spots across the width of the sheets, and in so doing to produce sheet glass of uniform thickness,—sheet glass which has superior optical properties.

Horizontal movement of the drawing receptacle (in the line of the width of the sheet being drawn) may advantageously be incorporated with the angular oscillation which is above described, and thus a two-fold action, so to speak, may be obtained for minimizing irregularities in the product. In Fig. III the drawing compartment 4 (from which compartment a glass sheet 14 is being drawn) is indicated in one extreme position of its angular and horizontal movement, and Fig. IV shows the other extreme position which the receptacle assumes during its oscillatory movements.

In the sheet-manufacturing procedure molten glass may be caused to flow continually from the tank 1 through the spout 2 into the receiving compartment 3 of the drawing receptacle 4, and thence under the curtain-wall 5 into the drawing compartment 6 of said receptacle. To the end that the drawing compartment may be oscillated in the desired manner I (conveniently) provide receptacle-supporting wheels 7 which ride on rails 8, the rails being located upon the opposite side walls of the heating kiln or furnace 9. Each rail or track 8 is, indeed, three rail members (Fig. II)—a central member 8a and two end members 8b, one rail portion 8b adjoining each end of the member 8a and sloping upward therefrom. The abutting ends of the rail portions are hinge connected at points 15, while the outer ends of the rail portions 8b are adjustably supported by rods 16. Rods 16 pass through suitable supporting members, such as the fragmentarily indicated struts 17, and the nuts 18 on the ends of rods 16, obviously, permit the raising and lowering of the outermost ends of the rail portions 8b, thus affording efficient means for adjusting the degree of inclination of the end rail portions, which, of course, determines the degree of tilting or angular movement of the receptacle 4 when it is reciprocated to and fro on the rails 8, as it in fact is reciprocated to obtain the desired oscillatory movement.

Means for effecting such receptacle reciprocation comprise a connecting rod 12 which is pivotally secured at one end to the receptacle, and at the other end to a crank disk 13. Crank 13 is geared for rotation to a motor (not shown), so that the glass-including receptacle may be oscillated both horizontally and angularly in lines extending with the plane of the glass sheet being drawn.

A burner or burners 10 supply heat to the kiln 9, and the products of combustion pass through the mouth 11 of the kiln and impinge upon the bottom of the receptacle 4, thus maintaining the glass in the receptacle at the proper temperature for drawing. The inside length of the drawing compartment 6 of the receptacle is greater than the width of the sheet to be drawn, and as the receptacle is reciprocated the opposite edges of the sheet being developed are caused to come intermittently into, or practically into, contact with the opposite end walls of the drawing receptacle, as indicated in Figs. III and IV. Such intermittent contacts of the edges of the sheet, during the drawing operation, serve to prevent the drawing in of the sheet, and tend to hold the sheet at its intended width. However, this feature is not primarily of the essence of the present invention.

The glass-drawing apparatus is not shown in the accompanying drawings, it being understood that any suitable glass-drawing equipment may be employed. (Several forms of such glass-drawing apparatus are now well known to the art.) Obviously, with some forms of drawing apparatus the drawing receptacle may be stationary and a portion of it, say, a drawing block, may be oscillated in the manner in which the oscillation of the receptacle 4 has been herein described, and in this respect the drawing block, or other portions of the glass receptacle, is also intended when I say "receptacle" in the following claims.

I claim as my invention:

1. In combination with apparatus for developing sheet glass, a receptacle containing a mass of molten glass from which to draw a sheet, and means for effecting angular movement of said receptacle while a sheet is being drawn.

2. In combination with apparatus for developing sheet glass, a receptacle containing a mass of molten glass from which to draw a sheet, and means for effecting over an interval of time angular oscillations of said receptacle, whereby said mass of glass is conditioned for the drawing of a sheet.

3. In combination with apparatus for developing sheet glass, a receptacle containing a mass of molten glass from which to draw a sheet, and means for effecting angular oscillation of said receptacle in lines extending with the plane of the sheet being drawn.

4. In combination with apparatus for developing sheet glass, a receptacle containing a mass of molten glass from which to draw a sheet, and means for effecting both angular and horizontal movement of said receptacle while a sheet is being drawn.

5. In combination with apparatus for developing sheet glass, a receptacle containing a mass of molten glass from which to draw a sheet, and means for effecting both angular and horizontal movement of said receptacle.

6. In combination with apparatus for developing sheet glass, a receptacle containing a mass of molten glass from which to draw a sheet and means for effecting both angular and horizontal oscillation of said receptacle in lines extending with the plane of the sheet being drawn.

7. The method of manufacturing sheet glass which comprises developing the sheet from a mass of molten glass within a receptacle, and during the operation causing an angular oscillation of said receptacle.

8. The method of manufacturing sheet glass which comprises developing the sheet from a mass of molten glass within a receptacle, and during the operation causing angular movement of said receptacle in lines extending with the plane of sheet development.

9. The method of manufacturing sheet glass which comprises developing the sheet from a mass of molten glass within a receptacle, and during the operation causing both angular and horizontal movement of said receptacle in lines extending with the plane of sheet development.

In testimony whereof I have hereunto set my hand.

CHARLES H. HARDING.